(12) United States Patent
Sumner-Moore

(10) Patent No.: US 7,693,837 B2
(45) Date of Patent: Apr. 6, 2010

(54) TECHNIQUE FOR SIMPLIFYING THE MANAGEMENT AND CONTROL OF FINE-GRAINED ACCESS

(75) Inventor: Scott Sumner-Moore, Benicia, CA (US)

(73) Assignee: International Business Machines Corporation, Armonk, NY (US)

( * ) Notice: Subject to any disclaimer, the term of this patent is extended or adjusted under 35 U.S.C. 154(b) by 669 days.

(21) Appl. No.: 11/104,318

(22) Filed: Apr. 12, 2005

(65) Prior Publication Data

US 2006/0230043 A1    Oct. 12, 2006

(51) Int. Cl.
G06F 7/00    (2006.01)
(52) U.S. Cl. .......................................................... 707/9
(58) Field of Classification Search ........................ None
See application file for complete search history.

(56) References Cited

U.S. PATENT DOCUMENTS

| | | | | |
|---|---|---|---|---|
| 5,276,901 | A |   | 1/1994 | Howell et al. ............... 398/800 |
| 5,742,759 | A | * | 4/1998 | Nessett et al. .................. 726/4 |
| 5,915,019 | A | * | 6/1999 | Ginter et al. .................. 705/54 |
| 6,412,070 | B1 | * | 6/2002 | Van Dyke et al. ............. 726/17 |
| 6,625,603 | B1 | * | 9/2003 | Garg et al. ...................... 707/9 |
| 6,813,617 | B2 |   | 11/2004 | Wong et al. .................... 707/4 |
| 2003/0236781 | A1 |   | 12/2003 | Lei et al. ........................ 707/3 |
| 2004/0093522 | A1 |   | 5/2004 | Bruestle et al. ............. 713/201 |
| 2005/0044396 | A1 | * | 2/2005 | Vogel et al. ................. 713/200 |
| 2005/0044426 | A1 | * | 2/2005 | Vogel et al. ................. 713/202 |

OTHER PUBLICATIONS

Akkar, Ty van den; Quinn O. Snell, Mark J. Clement, "The YGuard Access Control Model: Set Based Access Control", May 3-4, 2001, ACM, pp. 75-84.*
Wikipedia, at http://en.wikipedia.org/wiki/Access_control_list (last modified Mar. 6, 2005).

* cited by examiner

Primary Examiner—Sathyanarayan Pannala
Assistant Examiner—Dinku W Gebresenbet
(74) Attorney, Agent, or Firm—Yee & Associates, P.C.; William H. Steinberg; Rudolf O. Siegesmund

(57) ABSTRACT

The invention is an improvement to conventional access control systems that use ACLs. The improvement comprises an Access Control Set, which is a data structure of access rules, ACLs, and other ACSs, and an improved object manager program that controls access to data objects according to the contents of an ACS. As in systems that rely exclusively on ACLs, every data object in the improved system includes a reference to an ACS that determines a user's access rights to the data object.

3 Claims, 11 Drawing Sheets

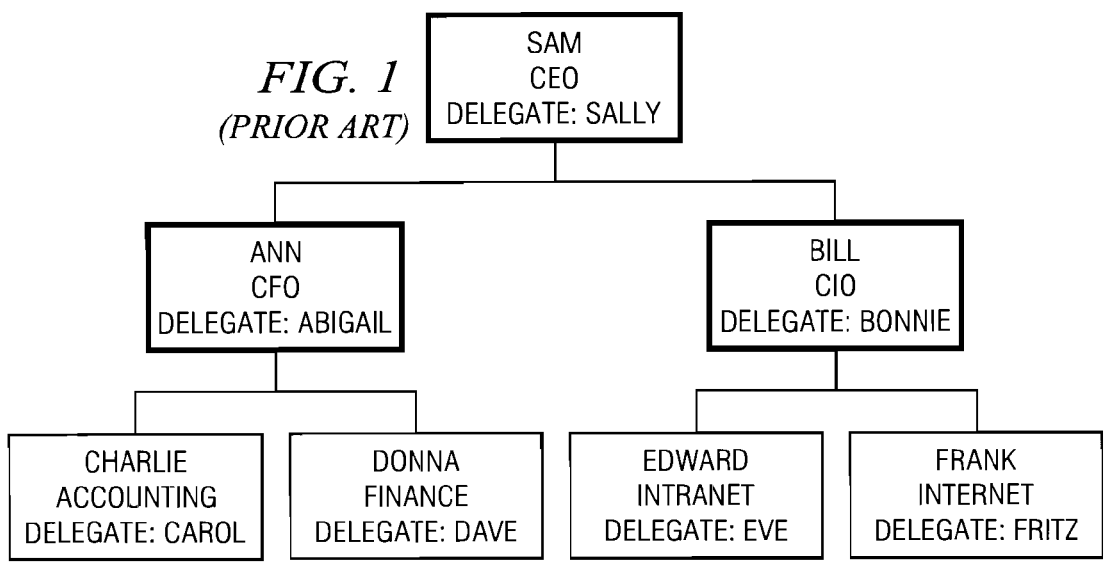

| GROUP | MEMBERS |
|---|---|
| CEOReaders | ANN, ABIGAIL, BILL, BONNIE, CHARLIE, CAROL, DONNA, DAVE, EDWARD, EVE, FRANK, FRITZ |
| CEOUpdaters | SAM, SALLY |
| CFOReaders | CHARLIE, CAROL, DONNA, DAVE |
| CFOUpdaters | SAM, SALLY, ANN, ABIGAIL |
| CIOReaders | EDWARD, EVE, FRANK, FRITZ |
| CIOUpdaters | SAM, SALLY, BILL, BONNIE |
| AccountingReaders | |
| AccountingUpdaters | SAM, SALLY, ANN, ABIGAIL, CHARLIE, CAROL |
| FinanceReaders | |
| FinanceUpdaters | SAM, SALLY, ANN, ABIGAIL, DONNA, DAVE |
| IntranetReaders | |
| IntranetUpdaters | SAM, SALLY, BILL, BONNIE, EDWARD, EVE |
| InternetReaders | |
| InternetUpdaters | SAM, SALLY, BILL, BONNIE, FRANK, FRITZ |

FIG. 3
*(PRIOR ART)*

| NODE | GROUP | ACCESS |
|---|---|---|
| CEO | CEOReaders | ReadAccess |
| | CEOUpdaters | UpdateAccess |
| CFO | CFOReaders | ReadAccess |
| | CFOUpdaters | UpdateAccess |
| CIO | CIOReaders | ReadAccess |
| | CIOUpdaters | UpdateAccess |
| ACCOUNTING | AccountingReaders | ReadAccess |
| | AccountingUpdaters | UpdateAccess |
| FINANCE | FinanceReaders | ReadAccess |
| | FinanceUpdaters | UpdateAccess |
| INTRANET | IntranetReaders | ReadAccess |
| | IntranetUpdaters | UpdateAccess |
| INTERNET | InternetReaders | ReadAccess |
| | InternetUpdaters | UpdateAccess |

FIG. 4
*(PRIOR ART)*

| GROUP | MEMBERS |
|---|---|
| CEOUsers | SAM, SALLY |
| CFOUsers | ANN, ABIGAIL |
| CIOUsers | BILL, BONNIE |
| AccountingUsers | CHARLIE, CAROL |
| FinanceUsers | DONNA, DAVE |
| IntranetUsers | EDWARD, EVE |
| InternetUsers | FRANK, FRITZ |

FIG. 5
(PRIOR ART)

| NODE | GROUP | ACCESS |
|---|---|---|
| CEO | CEOUsers | UpdateAccess |
| | CFOUsers | ReadAccess |
| | CIOUsers | ReadAccess |
| | AccountingUsers | ReadAccess |
| | FinanceUsers | ReadAccess |
| | IntranetUsers | ReadAccess |
| | InternetUsers | ReadAccess |
| CFO | CEOUsers | UpdateAccess |
| | CFOUsers | UpdateAccess |
| | AccountingUsers | ReadAccess |
| | FinanceUsers | ReadAccess |
| CIO | CEOUsers | UpdateAccess |
| | CIOUsers | UpdateAccess |
| | IntranetUsers | ReadAccess |
| | InternetUsers | ReadAccess |
| ACCOUNTING | CEOUsers | UpdateAccess |
| | CFOUsers | UpdateAccess |
| | AccountingUsers | UpdateAccess |
| FINANCE | CEOUsers | UpdateAccess |
| | CFOUsers | UpdateAccess |
| | FinanceUsers | UpdateAccess |
| INTRANET | CEOUsers | UpdateAccess |
| | CIOUsers | UpdateAccess |
| | IntranetUsers | UpdateAccess |
| INTERNET | CEOUsers | UpdateAccess |
| | CIOUsers | UpdateAccess |
| | InternetUsers | UpdateAccess |

FIG. 6
*(PRIOR ART)*

| GROUP | MEMBERS |
|---|---|
| CEOUsers | SAM, SALLY |
| CEOReaders | CFOReaders, CFOUsers, CIOReaders, CIOUsers |
| CEOUpdaters | CEOUsers |
| CFOUsers | ANN, ABIGAIL |
| CFOReaders | AccountingReaders, AccountingUsers, FinanceReaders, FinanceUsers |
| CFOUpdaters | CEOUpdaters, CFOUsers |
| CIOUsers | BILL, BONNIE |
| CIOReaders | IntranetReaders, IntranetUsers, InternetReaders, InternetUsers |
| CIOUpdaters | CEOUpdaters, CIOUsers |
| AccountingUsers | CHARLIE, CAROL |
| AccountingReaders | |
| AccountingUpdaters | CFOUpdaters, AccountingUsers |
| FinanceUsers | DONNA, DAVE |
| FinanceReaders | |
| FinanceUpdaters | CFOUpdaters, FinanceUsers |
| IntranetUsers | EDWARD, EVE |
| IntranetReaders | |
| IntranetUpdaters | CIOUpdaters, IntranetUsers |
| InternetUsers | FRANK, FRITZ |
| InternetReaders | |
| InternetUpdaters | CIOUpdaters, InternetUsers |

FIG. 7
*(PRIOR ART)*

| NODE | GROUP | ACCESS |
|---|---|---|
| CEO | CEOReaders | ReadAccess |
| | CEOUpdaters | UpdateAccess |
| CFO | CFOReaders | ReadAccess |
| | CFOUpdaters | UpdateAccess |
| CIO | CIOReaders | ReadAccess |
| | CIOUpdaters | UpdateAccess |
| ACCOUNTING | AccountingReaders | ReadAccess |
| | AccountingUpdaters | UpdateAccess |
| FINANCE | FinanceReaders | ReadAccess |
| | FinanceUpdaters | UpdateAccess |
| INTRANET | IntranetReaders | ReadAccess |
| | IntranetUpdaters | UpdateAccess |
| INTERNET | InternetReaders | ReadAccess |
| | InternetUpdaters | UpdateAccess |

FIG. 16

| NODE | SET ID | ACCESS DATA FIELD |
|---|---|---|
| CFO | CFO_Children | Accounting_Up |
| | | Finance_Up |
| | | Audit_Up |

FIG. 17

| NODE | SET ID | ACCESS DATA FIELD |
|---|---|---|
| CEO | CEO_Down | CEOUsers<=>Update Access |
| | | AuditUsers<=>Annotate Access |

FIG. 8
*(PRIOR ART)*

| GROUP | MEMBERS |
|---|---|
| CEOUsers | SAM, SALLY |
| CEOReaders | CFOReaders, CFOUsers, CIOReaders, CIOUsers |
| CEOUpdaters | CEOUsers |
| CFOUsers | ANN, ABIGAIL |
| CFOReaders | AccountingReaders, AccountingUsers, FinanceReaders, FinanceUsers, *AuditReaders, AuditUsers* |
| CFOUpdaters | CEOUpdaters, CFOUsers |
| CIOUsers | BILL, BONNIE |
| CIOReaders | IntranetReaders, IntranetUsers, InternetReaders, InternetUsers |
| CIOUpdaters | CEOUpdaters, CIOUsers |
| AccountingUsers | CHARLIE, CAROL |
| AccountingReaders | |
| AccountingUpdaters | CFOUpdaters, AccountingUsers |
| FinanceUsers | DONNA, DAVE |
| FinanceReaders | |
| FinanceUpdaters | CFOUpdaters, FinanceUsers |
| IntranetUsers | EDWARD, EVE |
| IntranetReaders | |
| IntranetUpdaters | CIOUpdaters, IntranetUsers |
| InternetUsers | FRANK, FRITZ |
| InternetReaders | |
| InternetUpdaters | CIOUpdaters, InternetUsers |
| *AuditUsers* | *LARRY, LANA* |
| *AuditReaders* | |
| *AuditUpdaters* | *CFOUpdaters, AuditUsers* |

FIG. 9
(PRIOR ART)

| NODE | GROUP | ACCESS |
|---|---|---|
| CEO | CEOReaders | ReadAccess |
| | CEOUpdaters | UpdateAccess |
| | *AuditUsers* | *AnnotateAccess* |
| CFO | CFOReaders | ReadAccess |
| | CFOUpdaters | UpdateAccess |
| | *AuditUsers* | *AnnotateAccess* |
| CIO | CIOReaders | ReadAccess |
| | CIOUpdaters | UpdateAccess |
| | *AuditUsers* | *AnnotateAccess* |
| ACCOUNTING | AccountingReaders | ReadAccess |
| | AccountingUpdaters | UpdateAccess |
| | *AuditUsers* | *AnnotateAccess* |
| FINANCE | FinanceReaders | ReadAccess |
| | FinanceUpdaters | UpdateAccess |
| | *AuditUsers* | *AnnotateAccess* |
| INTRANET | IntranetReaders | ReadAccess |
| | IntranetUpdaters | UpdateAccess |
| | *AuditUsers* | *AnnotateAccess* |
| INTERNET | InternetReaders | ReadAccess |
| | InternetUpdaters | UpdateAccess |
| | *AuditUsers* | *AnnotateAccess* |
| *AUDIT* | *AuditReaders* | *ReadAccess* |
| | *AuditUpdaters* | *UpdateAccess* |
| | *AuditUsers* | *AnnotateAccess* |

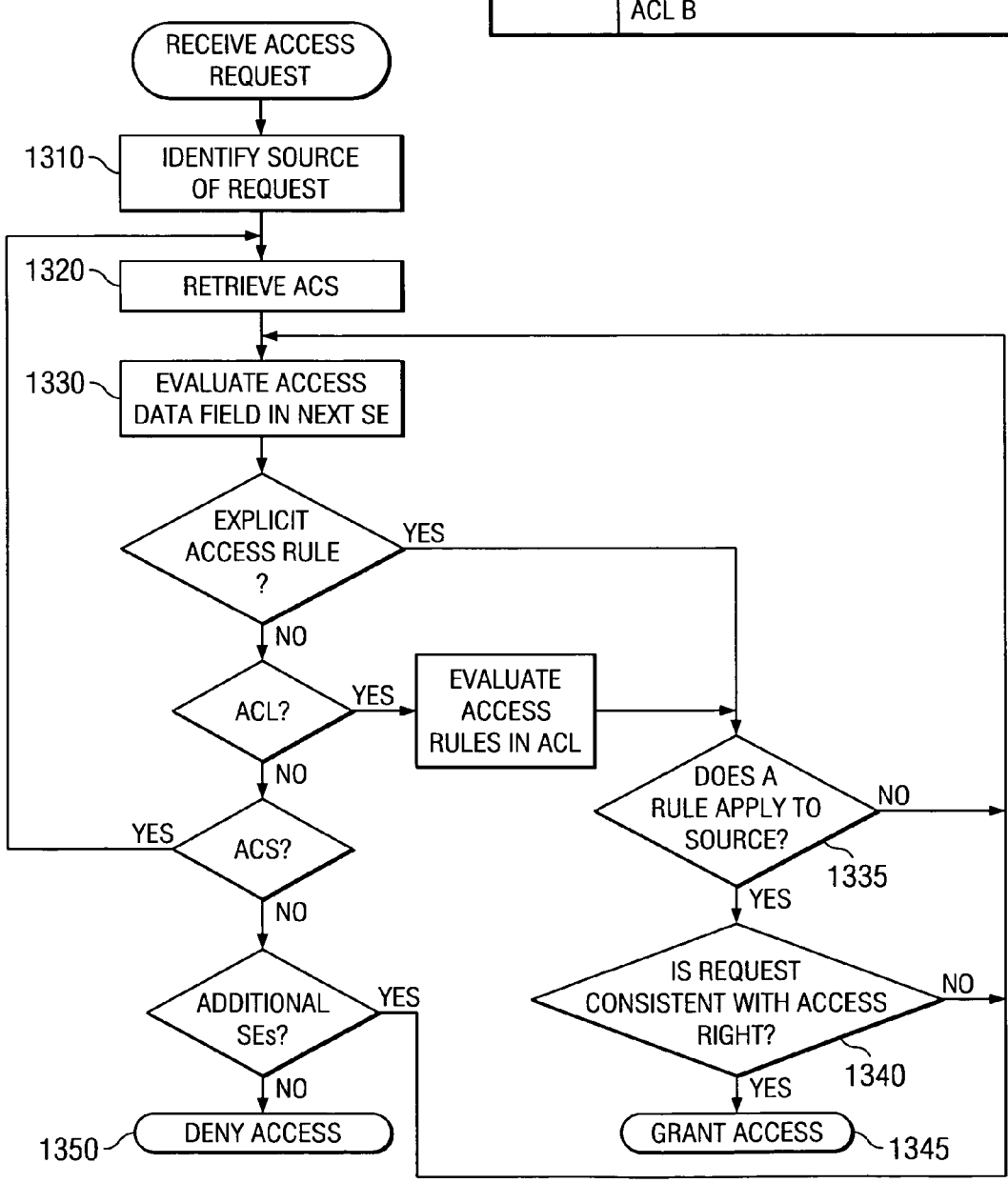

FIG. 14A

| NODE | SET ID | ACCESS DATA FIELD |
|---|---|---|
| CEO | CEO_Main | CEO_Down |
| | | CEO_Children |
| | CEO_Down | CEOUsers<=>Update Access |
| | CEO_Up | CEOUsers<=>Read Access |
| | | CEO_Children |
| | CEO_Children | CFO_Up |
| | | CIO_Up |
| CFO | CFO_Main | CFO_Down |
| | | CFO_Children |
| | CFO_Down | CFOUsers<=>Update Access |
| | | CEO_Down |
| | CFO_Up | CFOUsers<=>Read Access |
| | | CFO_Children |
| | CFO_Children | Accounting_Up |
| | | Finance_Up |
| CIO | CIO_Main | CIO_Down |
| | | CIO_Children |
| | CIO_Down | CIOUsers<=>Update Access |
| | | CEO_Down |
| | CIO_Up | CIOUsers<=>Read Access |
| | | CIO_Children |
| | CIO_Children | Intranet_Up |
| | | Internet_Up |
| ACCOUNTING | Accounting_Main | Accounting_Down |
| | | Accounting_Children |
| | Accounting_Down | AccountingUsers<=>Update Access |
| | | CFO_Down |
| | Accounting_Up | AccountingUsers<=>Read Access |
| | | Accounting_Children |
| | Accounting_Children | |
| FINANCE | Finance_Main | Finance_Down |
| | | Finance_Children |
| | Finance_Down | FinanceUsers<=>Update Access |
| | | CFO_Down |
| | Finance_Up | FinanceUsers<=>Read Access |
| | | Finance_Children |

FROM FIG. 14A

| | Finance_Children | |
|---|---|---|
| INTRANET | Intranet_Main | Intranet_Down |
| | | Intranet_Children |
| | Intranet_Down | IntranetUsers<=>Update Access |
| | | CIO_Down |
| | Intranet_Up | IntranetUsers<=>Read Access |
| | | Intranet_Children |
| | Intranet_Children | |
| INTERNET | Internet_Main | Internet_Down |
| | | Internet_Children |
| | Internet_Down | InternetUsers<=>Update Access |
| | | CIO_Down |
| | Internet_Up | InternetUsers<=>Read Access |
| | | Internet_Children |
| | Internet_Children | |

FIG. 15

| NODE | SET ID | ACCESS DATA FIELD |
|---|---|---|
| AUDIT | Audit_Main | Audit_Down |
| | | Audit_Children |
| | Audit_Down | AuditUsers<=>Update Access |
| | | CFO_Down |
| | Audit_Up | AuditUsers<=>Read Access |
| | | Audit_Children |
| | Audit_Children | |

TECHNIQUE FOR SIMPLIFYING THE MANAGEMENT AND CONTROL OF FINE-GRAINED ACCESS

FIELD OF THE INVENTION

The invention is related generally to data processing apparatus and corresponding methods for the retrieval of data stored in a database or as computer files, and specifically to subject matter directed to determining and granting access to data and files.

BACKGROUND OF THE INVENTION

In a modern computing system, access control lists (ACLs) are commonly used to enforce access rights to individual data objects in the system, such as a program, a process, or a file. See, generally, Wikipedia. The ACL is a means of determining the appropriate access rights to a given object given certain properties of a user (or process executed by the user) that is requesting access to the object. Id. The principal property that determines a user's access rights is the user's identity. Id.

An ACL is a data structure, usually a table, containing entries that specify an individual user's rights to specific system objects. Id. These entries are known as access control entries (ACEs) in the context of some popular operating system environments, such as MICROSOFT WINDOWS and OPENVMS. Id. Although each entry may associate a particular right with a single user, each entry more commonly associates a particular right with a group of users. Typically, the groups are defined in a separate data structure and an ACL merely includes a reference to the external group definition, but groups also may be defined within an ACL itself. Specific access rights (also known as "privileges " or "permissions") available in a specific system vary, but typically include rights to read from, write to, or execute an object. Each accessible object contains an identifier that references its ACL.

A "data object," though, is an abstract entity, and one data object may be a container for other objects. Thus, in theory, a single ACL that is defined for a container object can provide effective access control over a large number of individual objects within the container. But a computing system commonly needs to control access to large numbers of containers and to provide varying degrees of access to large numbers of objects within each container. The complexity of administering ACLs increases proportionally as the number and individual data objects that must be controlled increases. These complexities, and thus the inherent disadvantages of ACLs, are best demonstrated with a simple example. In this simple example, an enterprise content management (ECM) system organizes documents in a hierarchical tree structure that reflects the enterprise's organizational structure, such as the organization in FIG. 1, and ACLs are used to control access to the documents according to two simple business rules. The first rule is that users with update access to a node in the tree must have update access to all descendants of that node. The second rule is that users with update access to a node in the tree must have read access to all ancestors of that node.

The hierarchical tree structure of FIG. 1 represents an enterprise with a three-tier management structure, where each office or department is a node in the tree. According to the business rules described above, each officer or manager (and their respective delegates) are authorized to update their own documents and those documents belonging to any office or department that reports to them (i.e. is below them in the tree). Thus, Sam (as the CEO) and Sally (as his delegate) have the authority to update documents owned by the CEO, as well as documents for the entire enterprise. Thus, the CEO and the CEO Delegate are authorized to update not only documents associated with the CEO, but documents associated with the CFO and the CIO, as well as the departments that report to the CFO and CIO. Similarly, Bill (as the CIO) and Bonnie (as the CIO's delegate) have the authority to update the CIO documents, as well as the Intranet and Internet documents. Ann, the CFO, and Ann's delegate are authorized to update the CFO's documents, Accounting documents, and Finance documents. Neither the CIO nor the CFO, nor either of their delegates, however, has the authority to update the CEO's documents, but all are authorized to read those documents. Finally, on the lowest tier, Charlie, Donna, Edward, Frank, and their respective delegates have the authority to update the documents in their respective departments and the authority to read the CEO documents. In addition, Charlie and Donna have the authority to read the CFO documents and Edward and Frank have the authority to read the CIO documents. But neither Charlie, Donna, Edward, Frank, nor their delegates are necessarily authorized to read or update documents that belong to other departments on the same tier.

ACLs are flexible, and there are several ways to implement these business rules with ACLs. In one such implementation, an ACL uses a "reader" group and an "updater" group defined for each node in the tree, and each group identifies each individual user explicitly. Consequently, each group generally includes users from all over the hierarchy, which can be very inefficient and prone to errors if managed manually. Each ACL also defines only two rules—one rule that grants read access to the reader group and a second rule that grants update access to the updater group. This type of ACL implementation is illustrated in FIGS. 2 and 3. Note that the ACLs in this implementation are fairly straight-forward, and the access rules are essentially implemented in the group definitions. In practice, each document in a given node would include a reference to the appropriate access rule in FIG. 3, and each access rule might be identified by some arbitrary key value. Thus, any document in the CEO node would include a reference to the CEO access rules, which are defined in the first two rows of FIG. 3. For the sake of simplicity in this discussion, though, the access rules identified in FIG. 3 (and in the figures that follow) are given names that reflect the type of documents that they control.

In an alternate implementation, an ACL defines a single group corresponding to each node, but defines multiple rules that control each group's access to any given node. This implementation, illustrated in FIGS. 4 and 5, simplifies the group definitions at the expense of increasing the complexity of the access rules for each node.

Some ACL implementations also support the concept of "nested" groups. As illustrated above, standard ACL groups only identify individual users. Nested groups, though, can identify individual users and other groups. Thus, the example ACLs described above could be modified with nested groups, as illustrated in FIGS. 6 and 7.

Thus, these examples demonstrate the capacity of ACLs to implement a basic set of business rules in a simple organizational structure. The shortcomings of ACLs, though, become readily apparent when the organizational structure is modified slightly. Suppose, for example, that the enterprise adds an Audit Department that reports to the CFO. Moreover, anyone in the Audit Department should have read access to any document in the hierarchy, as well as annotate access to any document in the hierarchy. Here, "annotate access" includes authority to electronically highlight portions of the document, add electronic notes, and the like. In the implementation that uses nested groups (see FIGS. 6 and 7), this means that three new groups must be defined and every ACL in the hierarchy must be modified to give the Audit Department the authority to read and annotate everyone's documents. These changes are illustrated in italic typeface in FIGS. 8 and 9.

To implement the two original business rules for the Audit Department, note that the CFOReaders group also must be modified and new access rules created for the Audit Department. And because the existing groups are built specifically to accommodate those who need Read access and those who need Update access, these groups cannot be leveraged to add the Audit Department's annotation rights. Accordingly, a new access rule must be added to each node, as illustrated in FIG. 9.

As the above examples illustrate, ACLs provide a flexible mechanism for controlling access to a relatively small, static enterprise. Nested groups address some problems associated with larger or more dynamic enterprises, but as the above example also illustrates, ACLs—even ACLs that support nested groups—can require an enormous amount of administrative overhead even for relatively minor changes to a small enterprise. Thus, there remains a general need in the art for access control systems that overcomes the limitations of ACLs that impede effective administration in larger, more dynamic enterprises.

SUMMARY OF THE INVENTION

The invention is an improvement to conventional access control systems that use ACLs. The improvement comprises an Access Control Set (ACS), which is a data structure of access rules, ACLs, and other ACSs, and an improved object manager program that controls access to data objects according to the contents of an ACS. As in systems that rely exclusively on ACLs, every data object in the improved system includes a reference to an ACS that determines a user's access rights to the data object.

BRIEF DESCRIPTION OF DRAWINGS

The novel features believed characteristic of the invention are set forth in the appended claims. The invention itself, however, as well as a preferred mode of use, further objectives and advantages thereof, will be understood best by reference to the following detailed description of an illustrative embodiment when read in conjunction with the accompanying drawings, wherein:

FIG. 1 is an organizational chart of an exemplary enterprise used to demonstrate the features of the prior art and the present invention;

FIG. 2 represents a data structure that defines groups of users within the exemplary enterprise;

FIG. 3 represents an access control list that is used in conjunction with the data structure of FIG. 2 to control access to documents within the exemplary enterprise;

FIG. 4 represents a data structure that defines an alternative group of users within the exemplary enterprise;

FIG. 5 represents an alternative access control list that is used in conjunction with the data structure of FIG. 4 to control access to documents within the exemplary enterprise;

FIG. 6 represents a data structure that uses nested groups to define an alternative group of users within the exemplary enterprise;

FIG. 7 represents an alternative access control list that is used in conjunction with the data structure of FIG. 6 to control access to documents within the exemplary enterprise;

FIG. 8 represents a data structure that defines a group of users within a modified version of the exemplary enterprise;

FIG. 9 represents an access control list that is used in conjunction with the data structure of FIG. 8 to control access to documents within the modified exemplary enterprise;

FIG. 12B presents a hypothetical ACS that leverages hypothetical ACLs;

FIG. 13 is a flowchart of the method in which the object manager program of the present invention responds to an access request;

FIG. 14 represents exemplary access control sets that are used in conjunction with the data structure of FIG. 4 to control access to documents within the exemplary enterprise;

FIG. 15 represents additional access control sets that are used in conjunction with the data structure of FIG. 14 to control access to documents within the modified exemplary enterprise;

FIG. 16 illustrates additional modifications to the data structure of FIG. 14 that are required to control access to documents within the modified exemplary enterprise; and FIG. 17 illustrates the modifications to the data structure of FIG. 14 that are required to create a new access right for the modified exemplary enterprise.

DETAILED DESCRIPTION OF THE PREFERRED EMBODIMENT

The principles of the present invention are applicable to a variety of computer hardware and software configurations. The term "computer hardware" or "hardware," as used herein, refers to any machine or apparatus that is capable of accepting, performing logic operations on, storing, or displaying data, and includes without limitation processors and memory; the term "computer software" or "software," refers to any set of instructions operable to cause computer hardware to perform an operation. A "computer," as that term is used herein, includes without limitation any useful combination of hardware and software, and a "computer program" or "program" includes without limitation any software operable to cause computer hardware to accept, perform logic operations on, store, or display data. A computer program may, and often is, comprised of a plurality of smaller programming units, including without limitation subroutines, modules, functions, methods, and procedures. Thus, the functions of the present invention may be distributed among a plurality of computers and computer programs. The invention is described best, though, as a single computer program that configures and enables one or more general-purpose computers to implement the novel aspects of the invention. For illustrative purposes, the inventive computer program will be referred to as the "object manager program."

Figure 10:
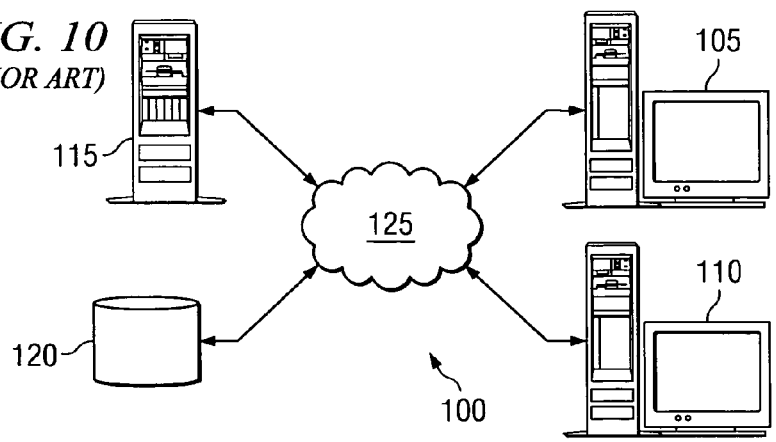
FIG. 10 represents an exemplary network of computers in which the present invention may operate.

Additionally, the object manger program is described below with reference to an exemplary network of hardware devices, as depicted in FIG. 10, which represents a typical operating environment for the present invention. A "network" comprises any number of hardware devices coupled to and in communication with each other through a communications medium, such as the Internet. A "communications medium" includes without limitation any physical, optical, electromagnetic, or other medium through which hardware or software can transmit data. For descriptive purposes, exemplary network 100 has only a limited number of nodes, including workstation computer 105, workstation computer 110, server computer 115, and persistent storage 120. Network connection 125 comprises all hardware, software, and communications media necessary to enable communication between network nodes 105-120. Unless otherwise indicated in context below, all network nodes use publicly available protocols or messaging services to communicate with each other through network connection 125.

Figure 11:
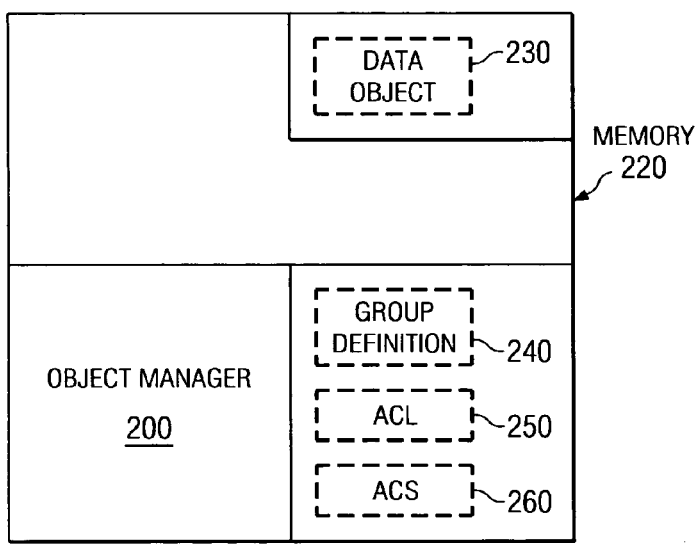
FIG. 11 is a schematic of a memory having the components of the present invention stored therein.

Object manager program 200 typically is stored in a memory, represented schematically as memory 220 in FIG. 11. The term "memory, " as used herein, includes without limitation any volatile or persistent medium, such as an electrical circuit, magnetic disk, or optical disk, in which a computer can store data or software for any duration. The term "memory " as used herein and the term "computer-readable medium " as used herein shall have the same meaning. A single memory may encompass and be distributed across a plurality of media. Thus, FIG. 11 is included merely as a descriptive expedient and does not necessarily reflect any particular physical embodiment of memory 220. As depicted in FIG. 11, though, memory 220 may include additional data and programs. Of particular importance to object manager program 200, memory 220 may include data objects such as data object 230, group definitions such as group definition 240, Access Control Lists such as ACL 250, and Access Control Sets (ACSs) such as ACS 260, with which object manager program 200 interacts.

Figure 12A:
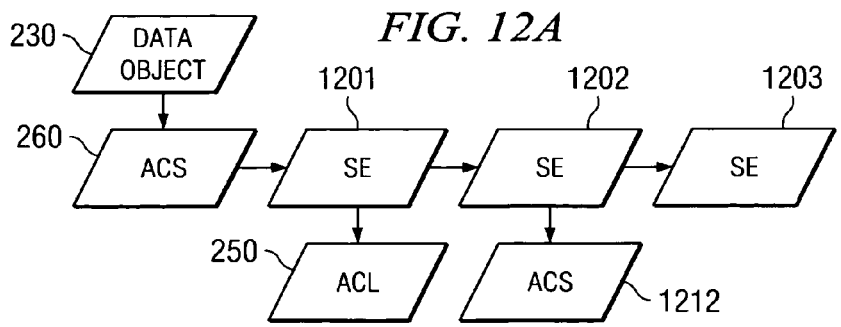
FIG. 12A illustrates the data structure of an access control set, linked to a data object.

An ACS is a novel data structure that leverages prior art data structures such as ACLs and group definitions to lessen the burden of administering an access control system in a modern data processing system. The basic elements of an ACS are illustrated in FIGS. 12A and 12B. Although FIG. 12A represents the data structure as a linked list, those skilled in the art are aware of acceptable substitutes for linked lists, including tables and the like, and such substitutes need not be described in detail here. An ACS, such as ACS 260, comprises a set identifier that uniquely identifies the ACS within the data processing system, and one or more access control set entries (SEs), such as SEs 1201-1203 depicted in FIG. 12A. Each SE comprises an access data field that explicitly defines a specific access rule or references another data structure that defines a specific access rule, such as an ACL or another access control set. SE 1201, for example, references ACL 250, while SE 1202 references ACS 1212. FIG. 12A also illustrates that data objects within the system, such as data object 230, must be adapted to reference an ACS, or more specifically, the set identifier of an ACS. An explicit access rule in an SE must identify an individual user or a defined group, and must associate an access right with the identified user or group. FIG. 12B presents a hypothetical ACS that leverages hypothetical ACLs. Although ACL X and ACS AB effectively consist of the same access rules, ACS AB is quite different from ACL X. If the access rule "Group C<=> Read Access" were added to ACL A, then Group C would automatically get Read Access through ACS AB, but the same access for Group C must be added manually to ACL X.

Object manager program 200 responds to a request from a user, through an application program, to access a data object. The method in which object manager program 200 responds to such an access request is illustrated in the flowchart of FIG. 13. Object manager program 200 first identifies the source of the request (1310). Typically, the source of the request is identified by a specific user's identity, which object manager program 200 can obtain from the operating system. Object manager program 200 then identifies and retrieves the ACS associated with the data object (1320). Object manager program 200 then steps through each SE in the ACS and evaluates the access data field (1330). If the access data field explicitly defines an access rule, object manager program 200 compares the source of the request with the user or group associated with the access right in the access rule (1335). If the source of the request is the user or a member of the group associated with the access right, object manager program 200 compares the access request with the access right (1340). If the requested access is consistent with the access right, object manager program 200 grants the requested access and control returns to the application program that initiated the request (1345). If the source of the request is not the user or a member of the group associated with the access right, or if the requested access is inconsistent with the associated access right, object manager program evaluates the next SE in the ACS (1330). If the access data field references another data structure, object manager program 200 retrieves and evaluates the data structure. If the data structure is an ACL, object manager program 200 evaluates the ACL in a conventional manner and grants the user access to the object according to the access rules in the ACL, if the user is a member of a group having the appropriate access right (1335-1340). If the referenced data structure is another ACS, object manager program 200 repeats these steps recursively until an access data field either explicitly defines an access rule or references an ACL. For descriptive purposes, this description is limited to access data fields that reference an ACL or another ACS, but the principles described are readily applicable to additional data structures not specifically discussed. If no SE is applicable to the source of the request, the default action is to deny access to the object (1350).

To further illustrate the advantages of ACSs over conventional techniques, such as ACLs, the following description refers to the simple enterprise represented in FIG. 1. Like ACLs, ACSs are flexible and there are numerous combinations of ACSs that can implement the example business rules, but the following implementations highlights the features and advantages of ACSs.

First, the ACSs are created to control access within the original organization, i.e. without the Audit Department. The group definitions are the same as those in FIG. 4, and are not repeated here. The ACSs for this implementation, though, are presented in FIG. 14 in tabular format.

The "Main" (e.g. CFO_Main) ACS is assigned to a specific node, and it contains the "Down" and "Children" ACSs. Each Down ACS has two SEs. For example, the first SE of the CFO_Down ACS grants the CFOUsers group the authority to update CFO documents. The second SE of the CFO_Down ACS includes the CEO_Down ACS, which grants the CEOUsers group the authority to update CFO documents. Thus, the Down ACSs implement the first business rule that requires users with update access to a node in the tree to have update access to all descendants of that node. The Children ACS contains the Up ACSs, which grant the Users group access to read documents in their respective nodes. For example, the CFO_Children ACS (the second SE of the CFO_Main ACS) contains the Accounting_Up and Finance_Up ACSs. In turn, the Accounting_Up ACS grants the AccountingUsers group Read access, and it includes the Accounting_Children ACS, which is empty. Likewise, the Finance_Up ACS grants the FinanceUsers group Read access, and it includes the Finance_Children ACS, which is empty. Thus, the second rule is implemented through coordination of the Up ACSs and the Children ACSs.

To add the Audit Department and comply with the first two business rules, as described above, only minimal changes to the ACS implementation are required. First, a new AuditUsers group is defined to include members of the Audit Department, and then four new ACS are created, which are presented in tabular format in FIG. 15. The only other required modification is to add the Audit_Up ACS to the CFO_Children ACS, as shown in FIG. 16. The need to explicitly propagate users and access controls up and down the hierarchy is eliminated.

To implement the third rule that mandates anyone in the Audit Department should have read access to any document in the hierarchy, as well as annotate access to any document in the hierarchy, only a single change to the ACS implementation is required. The AuditUpdaters group must be given Annotate authority in the CEO_Down ACS, as shown in FIG. 17. Since the rules in the CEO_Down ACS are propagated throughout the hierarchy, making this single change gives the Audit department Annotation access to all of the documents in the system. Unlike the implementation using nested groups in ACLs, the complete set of changes necessary to integrate the new Audit Department is isolated to a single change in a single node.

A comparison of the ACS implementation with the equivalent ACL implementations demonstrates that the initial configuration requires data structures of approximately equal complexity. The administrative burden of the ACS implementation, though, is significantly lower than that of the equivalent ACL implementation when access controls must be modified or created to accommodate corresponding changes or additions to enterprise structure or authority.

A preferred form of the invention has been shown in the drawings and described above, but variations in the preferred form will be apparent to those skilled in the art. The preceding description is for illustration purposes only, and the invention should not be construed as limited to the specific form shown and described. The scope of the invention should be limited only by the language of the following claims.

What is claimed is:

1. A computer-implemented method for controlling an access to each data object in a data processing system, the method comprising:
   creating, in the data processing system, a plurality of access control sets that match a desired hierarchical access configuration, wherein every data object in the data processing system includes a reference to a set identifier of a particular access control set, and
   wherein each of the plurality of particular access control sets includes the set identifier that uniquely identifies the particular access control set within the data processing system, a specific access rule, a reference to an access control list, and a reference to one or more included access control sets;
   loading a program into a memory of a computer in the data processing system; and
   activating the program, wherein the program is adapted to cause the processor of the computer to control the access for each data object in the data processing system by performing steps comprising:
   responsive to receiving an access request for a particular data object, identifying the source of the request and retrieving the particular access control set associated with the set identifier of the data object; and
   responsive to retrieving the particular access control set, examining the particular access control set, and determining whether the specific access rule applies to the source, and when the specific access rule does not apply to the source, determining whether an access control list rule in the control list applies to the source, and
   when the access control list does not contain an access rule list rule that applies to the source, retrieving one of the one or more included access control sets, and iterating through each identified specific rule, each identified access control list,
   each included access control set until either an applicable rule is located for the source, wherein access is granted, or there are no more included access control sets, wherein access is denied;
   responsive to a change in the desired hierarchical user access configuration, creating a plurality of new access control sets to reflect the change in the desired hierarchical user access configuration; and
   associating the plurality of new access control sets with the plurality of access control sets in order to eliminate a need to explicitly propagate a plurality of users and a plurality of access controls up and down the desired hierarchical user access configuration.

2. An apparatus for controlling an access to each data object in a data processing system, comprising:
   a computer connected to a storage and to the data processing system; and a program in the memory of the computer, the program containing a plurality of instructions adapted to cause the computer to control the access for each data object in the data processing system by performing steps comprising:
   creating, in the data processing system, a plurality of access control sets that match a desired hierarchical access configuration, wherein every data object in the data processing system includes a reference to a set identifier of a particular access control set, and wherein each of the plurality of particular access control sets includes the set identifier that uniquely identifies the particular access control set within the data processing system, a specific access rule, a reference to an access control list, and a reference to one or more included access control sets;
   responsive to receiving an access request for a particular data object, identifying the source of the request and retrieving the particular access control set associated with the set identifier of the data object; and
   responsive to retrieving the particular access control set, examining the particular access control set, and determining whether the specific access rule applies to the source, and when the specific access rule does not apply to the source, determining whether an access control list rule in the control list applies to the source, and
   when the access control list does not contain an access rule list rule that applies to the source, retrieving one of the one or more included access control sets,
   iterating through each identified specific rule, each identified access control list, and each included access control set until either an applicable rule is located for the source, wherein access is granted, or there are no more included access control sets, wherein access is denied;
   responsive to a change in the desired hierarchical user access configuration, creating a plurality of new access control sets to reflect the change in the desired hierarchical user access configuration; and
   associating the plurality of new access control sets with the plurality of access control sets in order to eliminate a need to explicitly propagate a plurality of users and a plurality of access controls up and down the desired hierarchical user access configuration.

3. A computer program product for controlling an access to each data object in a data processing system, comprising:
   a computer readable medium; and a program stored in the computer readable medium, the program containing a plurality of instructions adapted to cause a processor of a computer to control the access for each data object in the data processing system by performing steps comprising:

creating, in the data processing system, a plurality of access control sets that match a desired hierarchical access configuration, wherein every data object in the data processing system includes a reference to a set identifier of a particular access control set, and wherein each of the plurality of particular access control sets includes the set identifier that uniquely identifies the particular access control set within the data processing system, a specific access rule, a reference to an access control list, and a reference to one or more included access control sets;

responsive to receiving an access request for a particular data object, identifying the source of the request and retrieving the particular access control set associated with the set identifier of the data object; and responsive to retrieving the particular access control set, examining the particular access control set, and determining whether the specific access rule applies to the source, and when the specific access rule does not apply to the source, determining whether an access control list rule in the control list applies to the source, when the access control list does not contain an access rule list rule that applies to the source, retrieving one of the one or more included access control sets, and iterating through each identified specific rule, each identified access control list, and each included access control set until either an applicable rule is located for the source, wherein access is granted, or there are no more included access control sets, wherein access is denied;

responsive to a change in the desired hierarchical user access configuration, creating a plurality of new access control sets to reflect the change in the desired hierarchical user access configuration; and associating the plurality of new access control sets with the plurality of access control sets in order to eliminate a need to explicitly propagate a plurality of users and a plurality of access controls up and down the desired hierarchical user access configuration.

* * * * *